Dec. 13, 1960

F. N. GILLETTE 2,964,590

AUTOMATIC FOCUSING SYSTEM

Filed Nov. 25, 1958

INVENTOR.
FRANK N. GILLETTE

BY H. L. Mackey

ATTORNEY.

2,964,590

AUTOMATIC FOCUSING SYSTEM

Frank N. Gillette, Pleasantville, N.Y., assignor to General Precision, Inc., a corporation of Delaware Filed Nov. 25, 1958, Ser. No. 776,352

4 Claims. (Cl. 178—7.2)

Figure 1:
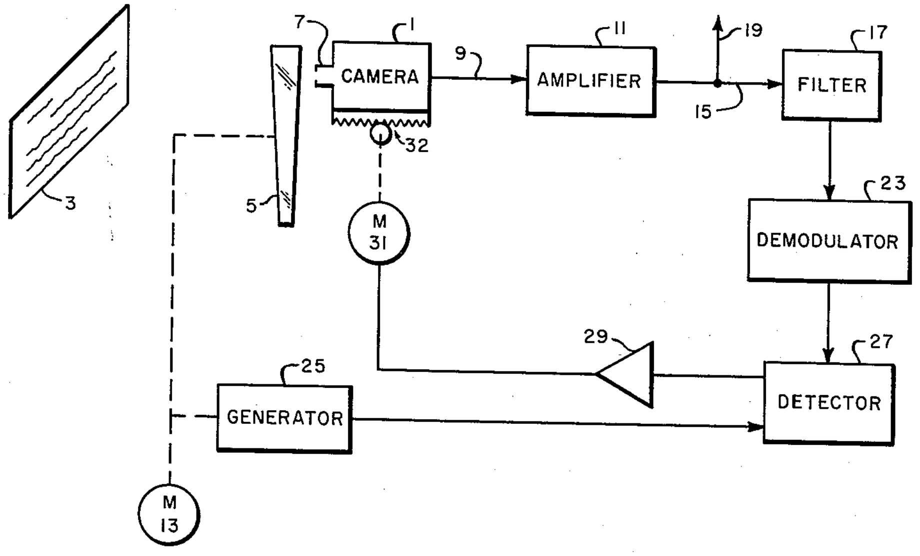

This invention relates to television picture generating systems and more particularly to a focusing system for television microviewing arrangements where fine focusing is necessary.

In television applications where the object being viewed is small and a great deal of magnification is required, it is essential that the focusing of the picture generator or camera be accurately maintained and therefore, one object of this invention is to provide an automatic focusing system for television picture generating systems which is accurate and reliable.

Another object of the invention is to provide an automatic focusing system for television picture generators which is compact, light in weight and easily manufactured.

The invention contemplates a focusing system comprising a television picture generator, first means between the generator and the object being viewed for periodically changing the effective light path between the object and the generator to modulate the generator output, a demodulator connected to the generator output for detecting the modulation envelope, second means connected to the demodulator and operated in synchronism with the first means for providing a signal which corresponds in amplitude and direction to deviations of the generator from the focused position, and a servo motor connected between said second means and the generator for positioning the generator in accordance with the signals from the second means.

The foregoing and other objects and advantages of the invention will appear more clearly from a consideration of the specification and drawings wherein several embodiments of the invention are described and shown for illustration purposes only.

Figure 2:
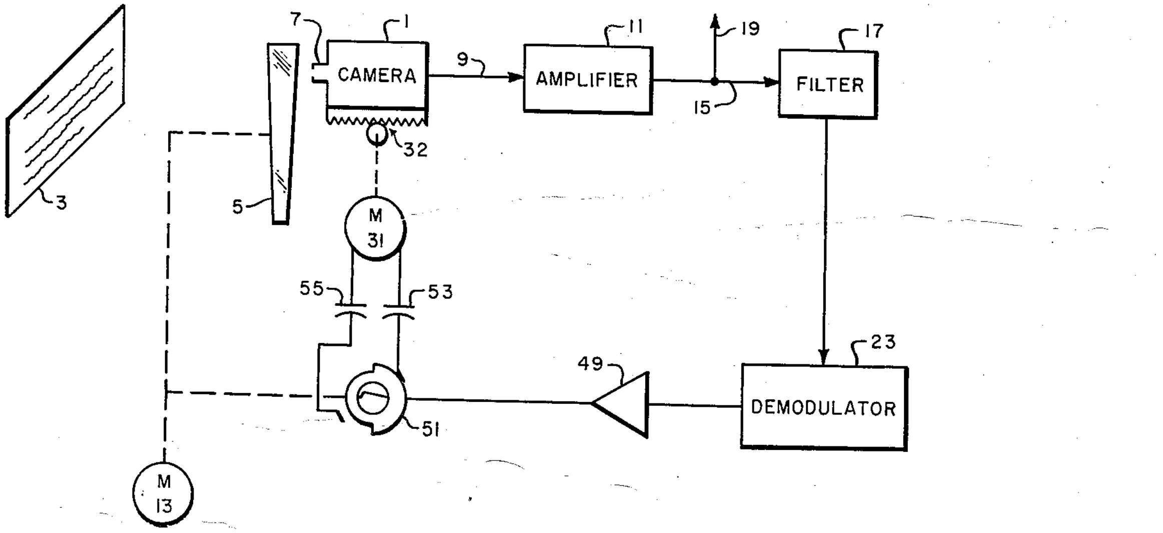

In the drawings:

Figure 1 is a schematic diagram of an automatic focusing system constructed in accordance with the invention; and Figure 2 is a schematic diagram of another embodiment of the invention.

In Fig. 1 a television camera or picture generator 1 is arranged to view a card 3 containing information imprinted thereon. Light reflected from car 3 passes through a transparent optical wedge 5 before entering the camera lens 7. The camera provides a video signal on line 9 which is amplified by an amplifier 11.

Card 3, in addition to the information, has a finely textured surface which is utilized to provide an output at the camera having a frequency greater than the video signal. The textured surface may be placed on the card at the time of manufacture or at some later time by embossing the card or by fine printing. Thus the light reflected from the card as it is scanned varies in intensity at a frequency determined by the separation between depressed regions formed in the embossing process and the scanning rate. Or alternatively the reflected light intensity is varied by the fine printed texture. As was previously pointed out the spacing between dark areas and the scanning rate combine to determine the frequency of the signal generated at the camera photo sensitive surface. This frequency is well above the highest video signal frequency supplied by the information on the card. The wedge 5 is rotated at a predetermined frequency by a motor 13 to periodically change the length of the effective light path between the card 3 and the camera 1. This periodic change in path length results in a modulation of the sharpness of focus at the camera photo sensitive surface which causes a change in amplitude of the video signal resulting from the finely textured surface described above. The modulation frequency is determined by the frequency of rotation of the wedge 5. The thickness of wedge 5 and the frequency of rotation are so selected that the modulation of the video portion of the camera signal will not result in serious distortion of the image reproduced on a receiver.

The output from amplifier 11 is supplied via line 15 to a filter 17 which filters out the video signal and passes only the modulated higher frequency signal resulting from the textured surface. A line 19 is provided for connecting the signal from line 15 to a television receiver not shown. The filtered signal is applied to a demodulator 23 which detects and passes the modulation envelope.

A generator 25 is mechanically connected to motor 13 and provides a pulsating output having the same frequency as the frequency of the modulation envelope which is determined by the frequency of rotation of wedge 5. The signals from demodulator 23 and generator 25 are applied to a phase detector 27 which supplies an output that corresponds to the phase shift between the two signals. This output is amplified by an amplifier 29 and applied to a motor 31 which positions camera 1 through a rack and pinion gear drive 32.

Generator 25 and wedge 5 are driven in synchronism by motor 13 and assuming the camera 1 to be initially in focus when the light reflected from card 3 is passing through the median thickness point of wedge 5 and any deviations in focus which take place thereafter will result in a corresponding shift in phase between the output of generator 25 and the modulation envelope. Phase detector 27 is arranged to supply an output which corresponds in amplitude and direction to the relative phase shift between the modulation envelope and the signal from generator 25 which in turn will correspond to the deviation of the camera from the focused position. This signal is amplified by amplifier 29 and used to drive motor 31 in the proper direction to return the camera to the focused position.

Ordinarily in operation the camera is positioned either manually or by some other mechanical means to a rough focused position and the device is set in operation to provide the fine focusing required in this type of viewing.

Considering the case where the camera is positioned at the correct focus the signal derived from the textured surface is periodically focused and defocused by the rotation of wedge 5. This results in a periodic increase and decrease in the intensity of the light falling on any given area of the photo sensitive surface which in turn results in a modulation of the camera output at a frequency determined by the speed of rotation of the wedge. When the camera is in focus the phase of the modulation envelope is identical to the phase of the output of generator 25. However, if for some reason the distance between the photo sensitive surface of the camera and the card changes the maximum and minimum camera output will be time shifted forward or backward depending on whether the distance decreases or increases with respect to the maximum and minimum output of generator 25 by an amount which corresponds to the linear displacement from the focus position of the card. This is so because the path length has changed and the path length at which focus occurs coincides with a different thickness of wedge 5 which rotates in synchronism with generator 25.

In Fig. 2 the output from demodulator 23 is amplified by amplifier 49 and applied to a switch 51 which is driven by motor 13 in synchronism with wedge 5 to alternately charge condensers 53 and 55. The voltage across motor 31 will then correspond in amplitude and direction to the phase relationship between the operation of switch 51 and the modulation envelope and motor 31 will position camera 1 in the same manner as in Fig. 1.

Although several embodiments of the invention have been shown and described in detail it is to be expressly understod that the invention is not limited thereto.

What is claimed is:

1. A television focusing system comprising, a television picture generator, an object to be viewed the surface of which is finely textured, first means positioned between the generator and the object for periodically changing the effective path length of the light between the object and the generator to periodically focus and defocus the light at the generator which modulates the amplitude of the generator output, a demodulator connected to the generator output for detecting the modulation envelope, second means connected to the demodulator and operated in synchronism with the first means to provide a signal corresponding in amplitude and direction to deviations of the generator from a focused position, and a servo motor connected to the said second means and said generator for positioning the generator in accordance with the signal from the second means.

2. The focusing system set forth in claim 1 wherein said first means includes an optical wedge positioned adjacent the generator and rotated at a predetermined speed.

3. The focusing system set forth in claim 1 wherein said second means includes a signal generator operated in synchronization with the first means, and a phase detector connected to the said signal generator and to the said demodulator for providing a signal corresponding to the difference in phase between the generated signal and the demodulated signal.

4. The focusing system set forth in claim 1 wherein said second means includes a pair of condensers, and a switch operated in synchronism with the first means for alternatively connecting the condensers to the demodulator.

References Cited in the file of this patent

UNITED STATES PATENTS 2,403,628 Beers ------------------- July 9, 1946
2,831,057 Orthuber --------------- Apr. 15, 1958